March 19, 1940.  I. G. EKLUND  2,194,356
AUTOMOBILE FRAME
Filed Sept. 24, 1936   6 Sheets-Sheet 1

INVENTOR.
IVAR G. EKLUND
BY
ATTORNEY.

March 19, 1940.　　　I. G. EKLUND　　　2,194,356
AUTOMOBILE FRAME
Filed Sept. 24, 1936　　　6 Sheets-Sheet 4

INVENTOR.
IVAR G. EKLUND
BY
ATTORNEY.

March 19, 1940.  I. G. EKLUND  2,194,356
AUTOMOBILE FRAME
Filed Sept. 24, 1936   6 Sheets-Sheet 5

INVENTOR.
IVAR G. EKLUND
BY
ATTORNEY.

Patented Mar. 19, 1940

2,194,356

UNITED STATES PATENT OFFICE 2,194,356

AUTOMOBILE FRAME

Ivar G. Eklund, Detroit, Mich., assignor to The Midland Steel Products Company, Cleveland, Ohio, a corporation of Ohio Application September 24, 1936, Serial No. 102,347

15 Claims. (Cl. 280—106)

This invention relates to new and useful improvements in automobile frames, the side rails of which are constituted by members having box-shaped cross section with outwardly extending flanges, and an important object of the invention is to provide in such a section, inexpensive and sturdy means for the attachment of bodies of automobiles, cross members of the frame, motor supports, spring hangers, bumper horns, etc.

This form of side rail section provides difficult problems for the attachment of the component parts of the frame and automobile and it is with the object of rendering the attachment of component parts in a simple and durable manner, that the various constructions shown herein are provided.

Other objects and advantages of the invention will become apparent during the course of the following description.

In the accompanying drawings forming a part of the application and wherein like numerals are employed to designate like parts throughout the several views.

Referring now more particularly to the drawings and especially to Figs. 1 to 6 inclusive, the numeral 1 designates a pair of longitudinal extending side bars or rails which are bowed outwardly from one another adjacent the mid-section of the frame and each is composed of an outwardly facing uniform light gauge channel section having a vertical web 2, horizontal upper and lower flanges 3 and 4 respectively, each of which terminates in a marginal vertical flange 5. These flanges 5 are coplanar and the channel of the section is closed and formed into box-section by means of a heavy gauge flat plate 6 spot welded or secured in any other suitable manner to the marginal flanges 5 as best appreciated from Fig. 3. With this heavier gauge plate the frame is made stronger and adjuncts of the frame which could not be secured to the lighter gauge channel in a manner to be permanent, can be attached to the plates 6. This channel closing strip 6 is preferably made integral throughout the length of the side rail, but of course may be formed in separate pieces for the sake of economy if desired. The channel section rail as well as the strip 6 for forming it into closed box section are provided with the usual front and rear kickups 7 and 8 respectively.

Figures 2, 3, 4, 5, 6:
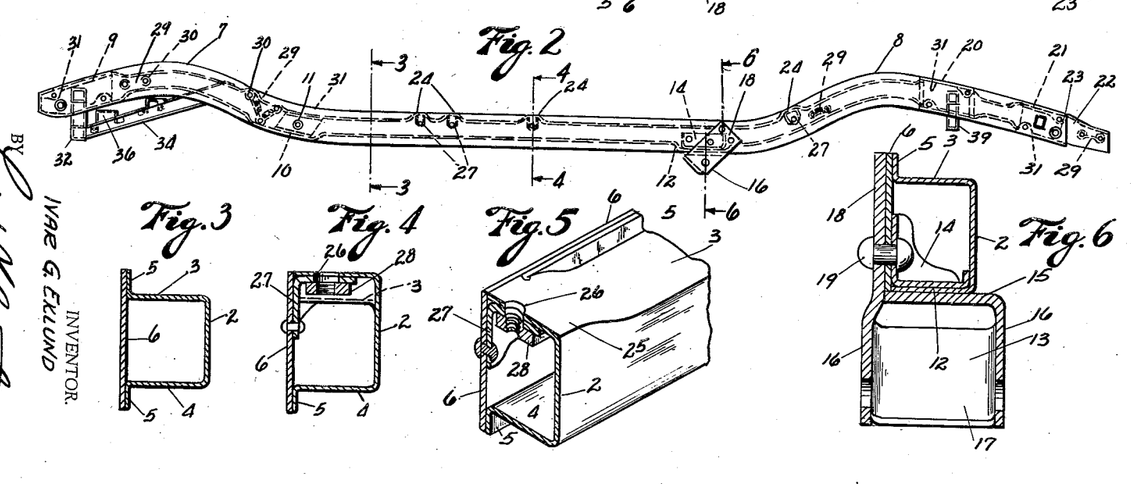
Fig. 2 is a side elevation of the same.
Fig. 3 is a transverse section on the line 3—3 of Fig. 2.
Fig. 4 is a transverse section of the same on the line 4—4 of Fig. 2.
Fig. 5 is an enlarged fragmentary perspective view of a part of the frame taken on the line of approximately 4—4 of Fig. 2.
Fig. 6 is a transverse section taken on the line 6—6 of Fig. 2 through the forward hanger of a rear spring.

At certain points throughout the length of the frame, each channel section has one or both flanges 3 and 4 offset and formed so as to dispose these portions of the rails in the same horizontal planes as the upper and lower longitudinal edges of the channel closing plates 6. Both the upper and lower flanges 3 and 4 are offset vertically in this fashion at the forward end of each rail designated by the numeral 9 where the forward hanger of the front spring is attached. The lower flange 4 of the rail to the rear of the front kickup is similarly offset as at 10 adjacent the point where a bearing 11 is extended transversely through the box section rail for the attachment of the rear hangers of the front springs. This same lower flange of the channel rail is also offset as at 12 to be disposed in the same horizontal plane as the lower edge of plate 6 at a point forwardly of the rear kickup for the attachment of the forward hanger 13 of the rear spring. At this point an L-shaped reinforcement 14 with side flanges is positioned within the box section rail 2 to be secured to the offset portion 12 of the side rail. The hanger 13 has a horizontal portion 15 engaged against the under side of the rail and a pair of apertured depending ears 16 connected by a forwardly and upwardly inclined wall 17, which portions are arranged beneath the lower flange of the side rail in a position to receive the bearing of the rear spring. The side wall 16 of this bracket is continued upwardly at a rearward angle to be arranged flush against the exposed side of the closing plate 6 to be secured thereto by means of fastenings 19 which also extend through the members 14 and can be united with the parts in spite of their being of closed section. Such rivets are known to the art and are provided with tubular shanks through which heading means can be employed for up-setting and heading the inner head of the rivet which is disposed within the tubular rail.

The upper and lower flanges 3 and 4 are also upset into the horizontal plane of opposite edges of the closure plate 6 at 20 immediately behind the rear kickup 8 and again in spaced relation thereto at the rearmost end of the frame indicated by the numeral 21. A rear bumper horn 22 is telescopically mounted within the tubular section of the rail at its rear end and is secured therein by any suitable means. A transverse tubular reinforcing member 23 extends through the web 2 and reinforcing plate 6 of the rail and constitutes means for mounting the rear spring shackle bolts.

At the point designated by the numeral 24 the upper flange 3 of each rail is offset vertically as at 25 to be disposed in the same horizontal plane with the upper contiguous edges of the closure plate 6 and upper flange 5 as best appreciated from Fig. 5 of the drawings. Here, the flange is provided with a perforation 26 which registers with a corresponding one in an L-shaped corner bracket 27 secured inside of the tubular rail preferably by welding although other forms of fastening may be employed. This bracket adds additional thickness to the light gauge stock employed in the side rail construction so that the attachment of adjuncts to these light gauge parts by welding will not excessively burn the same.

A welded clinch nut 28 is arranged inside of the tubular rail with its threaded aperture in registration with the aperture 26. Projections are provided upon the nut in order that it may be projection welded to the horizontal portion of the bracket 27. In this manner, the body parts find support of substantial area upon the side rails and attaching bolts may be threaded through the registering apertures and screwed into the clinch nuts fastened on the inside of the rail.

At intervals throughout the length of each rail, reinforcements 29 in the form of plates having their ends 30 rolled into tubular form, are secured to the web 2 and closing plates 6. These reinforcements may be welded within the tubular sections of the rails with their rolled ends in alignment with apertures in the web 2 and closure members 6. The edges of the arms of the reinforcement may be provided with integral tabs 29a for securement to the walls of the rail as shown in Figs. 2, 23, 31 and 34. Within the hollow rails where their upper and lower flanges have been offset at 9, 11, 20 and 21, channel-shaped reinforcements 31 may be installed to rigidify the rail at these points and where other adjuncts are attached.

Figure 1:
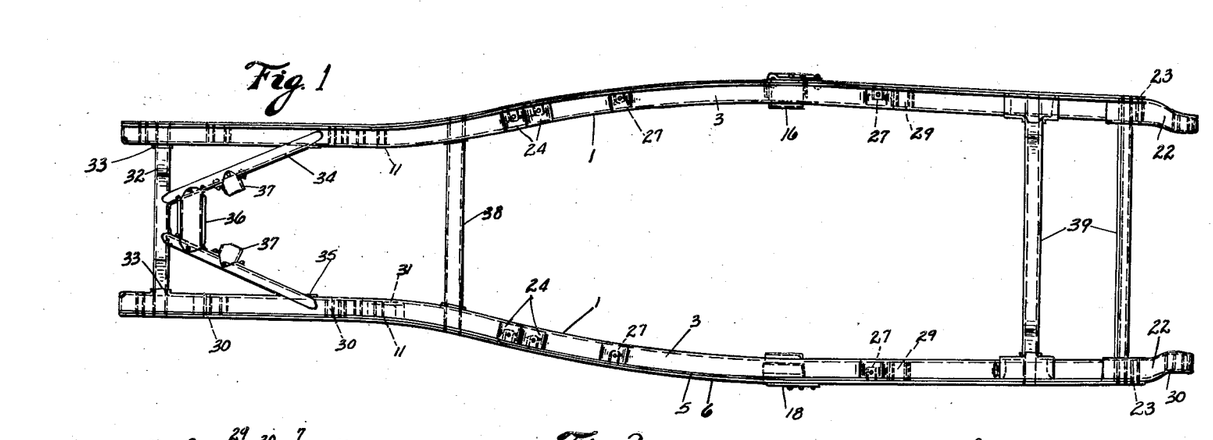
Fig. 1 is a top plan of one form of frame.

A tubular front cross member 32 connects the forward ends of the two rails 1 by extending through apertures surrounded by struck out welding projections 33 formed on the web portions 2. The ends of this cross member extend on through the box section and through the heavy gauge closure plate 6 to be welded thereto. Combined with this front cross member are motor supporting diagonals 34 of channel-shaped section with their ends formed with angular projections 35 to overlap the top and bottom of the side rails and cross members. These arms 34 have their rear ends fastened to the side rails with their forward ends arranged in inwardly diverging relationship to be attached to the front cross member adjacent its midsection. In addition, these arms are connected by an inverted channel-shaped supplemental cross member 36, and motor supports 37 are fastened to the arms 34 in any suitable manner.

Spaced rearwardly of the arms 34 and at substantially the dash line of the frame, is a second transverse cross member 38 also of tubular structure, which is extended through the web of the two rails and their respective closing plates to be welded thereto.

At the rear end of the frame are a pair of transverse tubular cross members 39 which are fastened to the side rails in the same manner as the other cross members, it being noted that they all project through, not only both walls of the tubular side rails, but also through the reinforcements 31 fastened inside of the box section rails.

Figures 7, 8, 9, 10, 11, 12, 13:
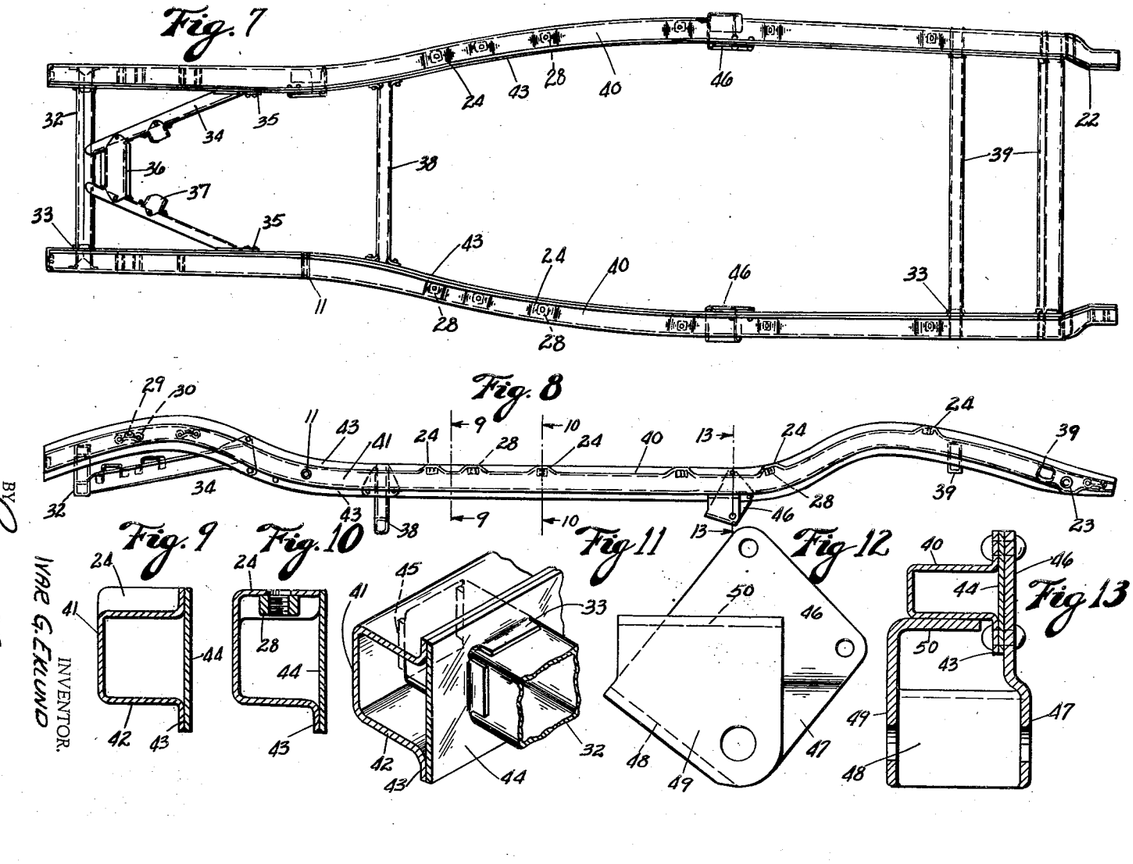
Fig. 7 is a top plan of a modified form of frame with the channels facing inwardly.
Fig. 8 is a side elevation of the same.
Fig. 9 is an enlarged transverse section on the line 9—9 of Fig. 8.
Fig. 10 is an enlarged transverse section along the line 10—10 of Fig. 8.
Fig. 11 is a fragmentary perspective view showing one form of attaching tubular cross members to the side rails.
Fig. 12 is a side elevation of the forward hanger of a rear spring.
Fig. 13 is a transverse section taken on the lines 13—13 of Fig. 8.
Figure 14:
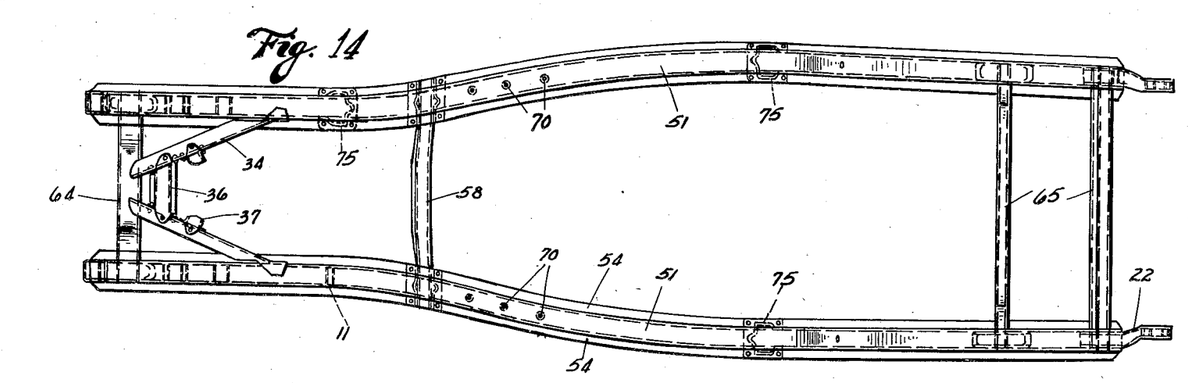
Fig. 14 is a top elevation of a modified form of frame with the channel members thereof facing downwardly.

In the frame shown in Figs. 7 to 13 inclusive, the parts corresponding with parts in the preceding form are designated with corresponding numerals. The main difference between these two frames is that in the one shown in Figs. 7 to 13, the light gauge channels of the side rails open inwardly of the frame instead of outwardly so that the web 41 of each side rail 40 is disposed outermost with the flanges 42 extending inwardly toward the longitudinal center line of the frame. These horizontal flanges have their margins turned out to provide flanges 43 normal to flanges 42 for spot welding to the heavy gauge closure plates 44 arranged on the inner side of the rails. In this modification certain portions 24 of the upper flanges 42 of the side rails are offset as in the preceding modification to provide ample attachment areas for the body. As shown in Fig. 11 the forward and rear cross members extend through openings in the closure plates 44 and the free ends of the tubular members are provided with longitudinally extending prongs 45 through correspondingly shaped slots in the web 41 to be welded thereto as around the integral projections 33 formed out of the closure plate 44.

A slightly different form of spring hanger for this frame is shown in Figs. 12 and 13. This hanger is also a stamping composed of a side 46 secured in any suitable manner to the closing plate 44 of the side rail and is provided with an outwardly offset lower end 47 forming one ear of a pair, the other 49, of which is united therewith by a forwardly and upwardly inclined bridge portion 48. The other ear 49 of this pair is perforated like its brother to provide a support for the front end of the rear spring. This ear continues up to a point where it is bent inwardly toward the wall 46 to provide somewhat of a shelf or platform for the lower flange of the side rail.

In the form of invention shown in Figs. 14 to 21 inclusive, parts corresponding to those of the preceding modifications are designated with corresponding reference numerals. The two side rails in this modification are composed of light gauge channels each having a web 52 and a pair of spaced parallel depending flanges 53 terminating in horizontal outwardly extending flanges 54 which are connected by a heavy gauge closing plate 55 having its margins 56 welded or otherwise secured to the flanges 54 and an intermediate portion 57 offset to extend into the open channel of the downwardly facing rail. This arrangement provides each side rail with a box-shaped cross section with flanges extending outwardly and inwardly of the frame at the bottom of the rail as clearly seen in Fig. 16.

Figure 20:
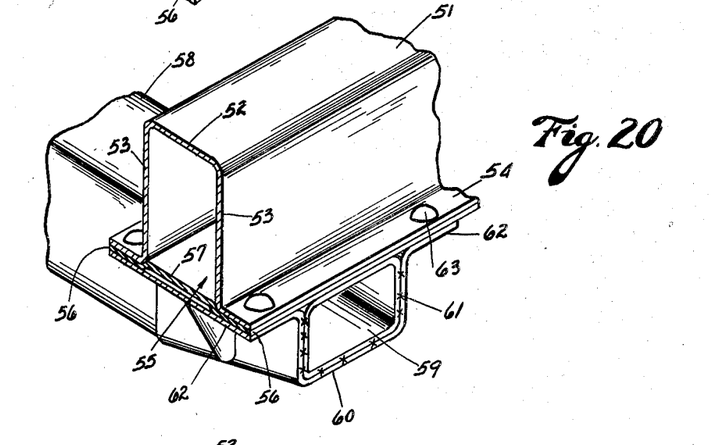
Fig. 20 is a similar view showing another method of attachment of cross members.

In this modification, the cross member 58 connecting the rails in proximity to the dash line and better shown in Fig. 20 is of tubular construction and with its ends 59 reduced and extended under the channel closing plate 55. In order to fasten the ends of the cross member in this relation, U-shaped brackets 60 are provided and are welded to each end of the cross member as at 61. This bracket has a pair of laterally extending wings or flanges 62 which are disposed in contact with the underside of the closure plate 55 so that common fastening elements 63 may be passed through the flanges of the side rails, the margins 56 of the closure plate 55 as well as the flanges 62 of the brackets.

Figure 19:
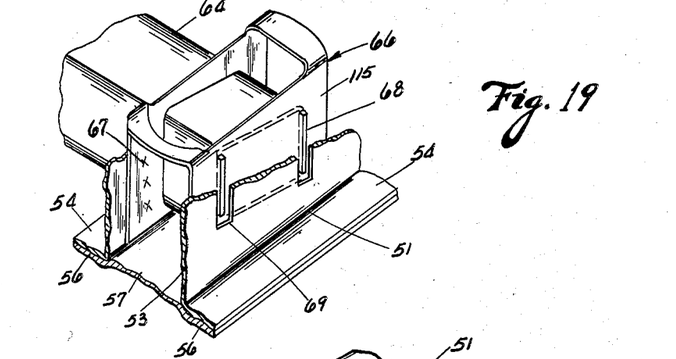
Fig. 19 is an enlarged fragmentary perspective view showing one manner of attaching tubular cross members to this type of rail.

The forward cross member of this frame as well as the two rear cross members 65 are of tubular construction and extend through the depending arms 115 of a U-shaped heavy gauge reinforcement 66 fastened inside of the box section side rail 51 and as best seen in Fig. 19. The arms 115 of the reinforcement are spot welded as at 67 to the flanges 53 of the side rail. The end of the cross member 64 extends through registering openings in the inner flange 53 and the inner vertical arm 115 of the reinforcement and is circumferentially welded thereto, while the ends of the cross member are each provided with a pair of vertical projections 68 extending through correspondingly shaped slots in the outer leg 115 of the reinforcement 66 to be welded thereto by projecting a welding flame through slots 69 provided in the outer flange of the side rail.

Figure 21:
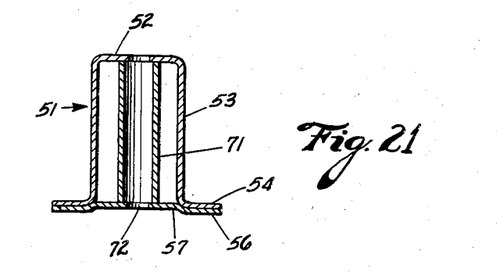
Fig. 21 is an enlarged transverse section of the side rails showing appropriate tubular vertical reinforcements therefor.
Figures 22, 23:
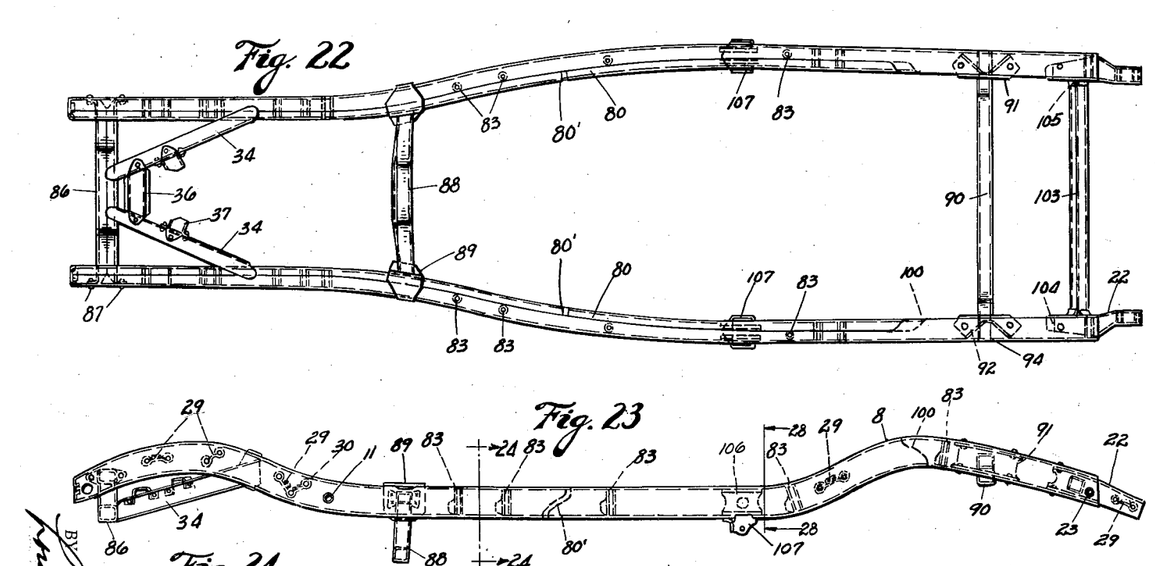
Fig. 22 is a top elevation of a further modified form of frame, the side rails of which are devoid of lateral flanges.
Fig. 23 is a side elevation of the same.

At the points designated by the numeral 70 along the side rail are provided load bearing reinforcements in the form of vertical tubes 71 arranged within the box section of the rail and with one end welded to the web 52 of the rail and at its opposite end to the closure plate 57. These two latter elements may be perforated as at 72 for the insertion of bolts or other forms of fastening means by which the component parts of the side rails may be bolted together or other adjuncts attached thereto, with these bolts.

Figures 15, 16, 17, 18:
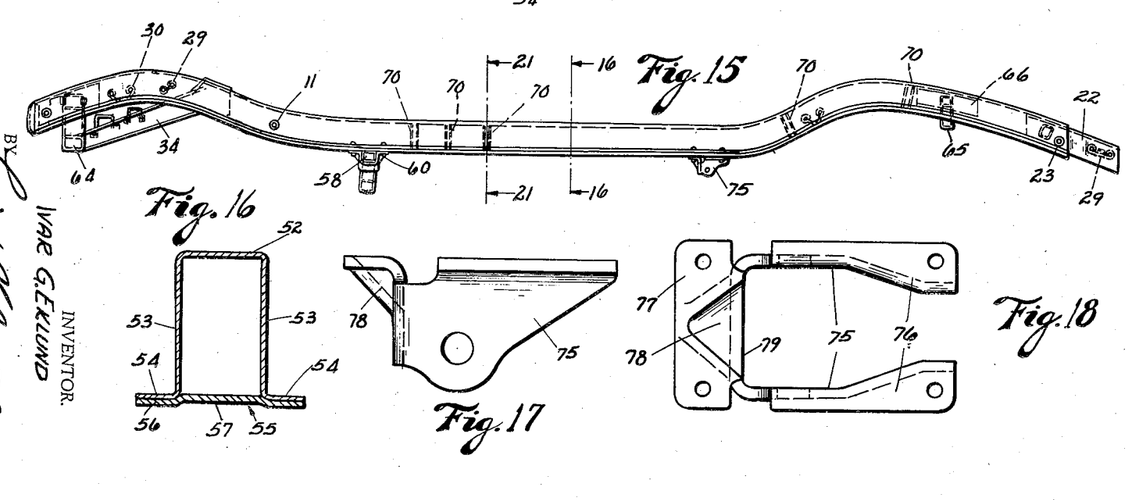
Fig. 15 is a side elevation of the same.
Fig. 16 is an enlarged section taken on the line 16—16 of Fig. 15.
Fig. 17 is a side elevation of a form of forward hanger for the rear springs.
Fig. 18 is a top elevation of the hanger.

The hangers for the forward ends of the rear springs are shown in Figs. 17 and 18 and each is composed of a stamping having a pair of parallel legs 75 perforated to receive the shackle bolt. The upper ends of these perforated arms are provided with lateral wings or flanges 76 which are riveted to the channel closing plates 55. These arms 75 merge into a bracket portion 77 having a V-shaped depression 78 forming a strut in the portion of the bracket between the horizontal portion 77 and the vertical bridge portion 79.

Figs. 22 to 32 inclusive show a modified form of frame in which the two side rails 80 are not provided with the horizontal flanges, but in which each is composed of a pair of channel-shaped stampings arranged with their flanges extending toward one another and butt welded along the lines 82, to provide the box section rail throughout its entire length. At intervals designated by the numeral 83 are provided tubular reinforcements shown in Figs. 24 to 26 inclusive. These reinforcements are provided out of a single stamping with one longitudinal edge rolled into a tube 84 and terminating in an angular flange 85 which is suitably secured, by spot welding, or otherwise, to the inner surface of the tubular rail so that the tubular portion 84 of the reinforcement is disposed vertically as shown.

Figures 29, 30, 33, 34:
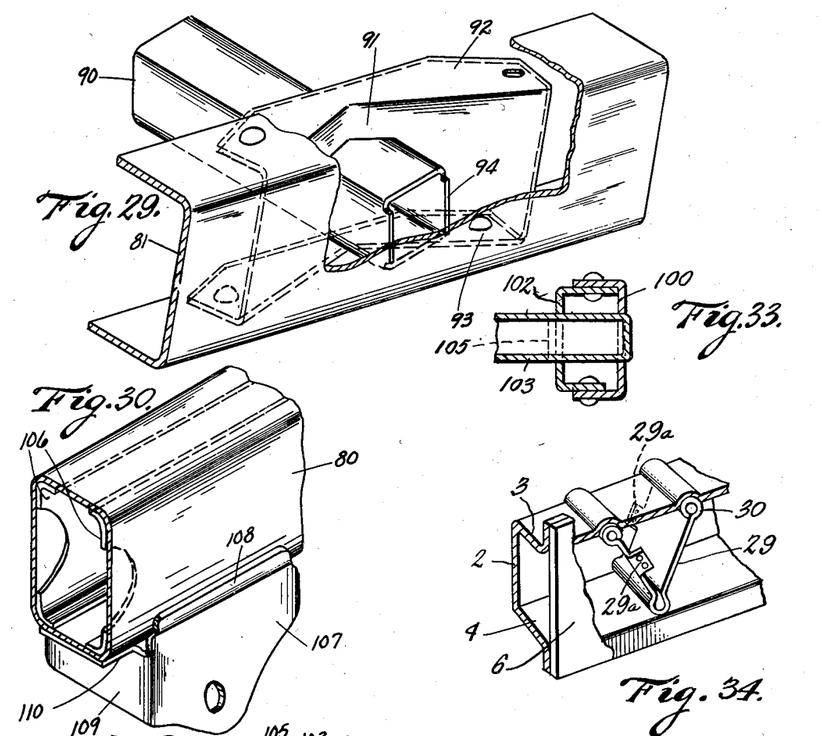
Fig. 29 is an enlarged fragmentary perspective view showing the attachment of one of the rear cross members to this frame.
Fig. 30 is an enlarged fragmentary transverse section of the rail adjacent the forward hanger of the rear spring.
Fig. 33 is a fragmentary sectional view showing the joint between the rear cross member and the side rail.
Fig. 34 is a fragmentary view showing a reinforcement applied to the rail.

The side rails adjacent their forward ends are secured in spaced relationship by a forward tubular cross member 86 extending into the hollow box section and there being bifurcated and formed into a pair of oppositely extending arms 87 which are riveted or welded to the inner side of the outer vertical wall of the side rail. The second transverse cross member 88 is of tubular formation and has its ends 89 formed to overlap the top and bottom of the tubular section rail. The first rear cross member 90 is of tubular shape and as best seen in Fig. 29 has each of its ends extended through an opening formed in the angle of a bracket 91 and circumferentially welded thereto. This bracket 91 is of channel configuration with its upper and lower flanges 92 and 93 fastened to the inner surfaces of the top and bottom of the channel rail. Each end of the cross member is formed with projections 94 which extend through correspondingly shaped slots in the outer side wall of the rail to be welded thereto.

In order that the connection of the ends of the rear cross members to the side rails may be understood more clearly, it is desired to point out that each side rail is of box construction from its forward end back to the point designated 100 just in advance of the rear cross member 90 and is formed in this manner by reason of the inner channel 81 boxing in the outer channel from the forward end, to this point 100 and from there back the outer channel continues on to the rear end of the frame so that rearwardly of the rear kickup 8 each side rail is of channel-shaped construction. The inner side of each side rail may also be constituted by two separate channel stampings, one extending from the forward end of the side rail to the point marked 80' and the other from this point back to the point marked 100.

Figure 31:
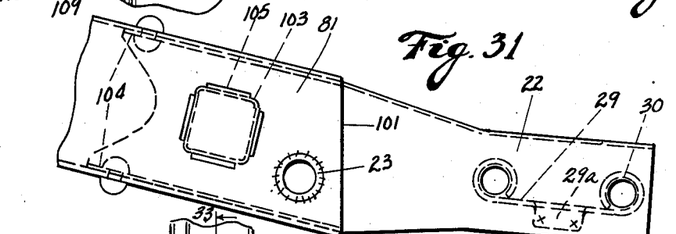
Fig. 31 is an enlarged side elevation of the rear end of the frame showing the attachment of the rear bumper horns and rear cross member.
Figure 32:
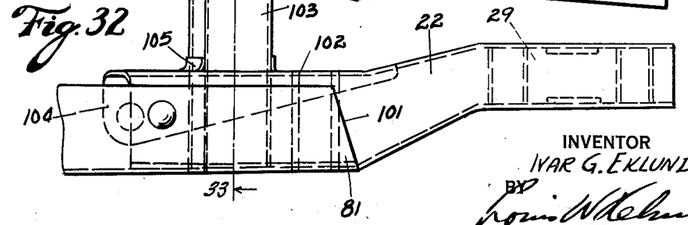
Fig. 32 is a top elevation of the same.

From Figs. 31 and 32, it will be seen that the rear bumper supporting horns 22 are of inverted channel shape and are inserted into the rear ends of the channel side rails 81 to be welded to the edges thereof as at 101. The inner side wall of the horn 22 at the portion 102 is of substantially box-shaped cross section to provide this end of the rail with a tubular rear end for the insertion of the end of a tubular rear cross member 103. This wall 102 is provided with horizontal flanges 104 which nest within the rear ends of the channel side rail 81 and are secured thereto with any suitable means. Each end of the rearmost cross member 103 extends through the web of the channel side rail 81 to be welded thereto while the wall 102 is provided with integral outstruck portions 105 embracing the tubular end of the cross member to be welded thereto.

Figures 24, 27:
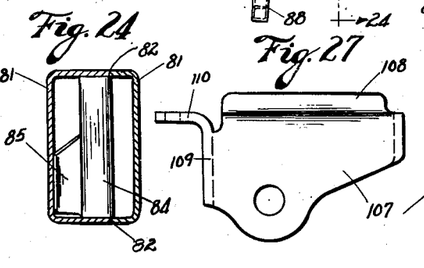
Fig. 24 is an enlarged transverse section taken on the line 24—24 of Fig. 23.
Fig. 27 is a side elevation of a forward hanger for the rear spring of this frame.
Figures 25, 26, 28:
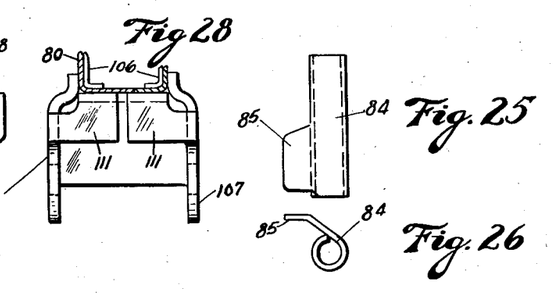
Fig. 25 is a side elevation of the vertical tubular reinforcement for the frame.
Fig. 26 is a top plan of the same.
Fig. 28 is a transverse fragmentary section of the side rails taken on the lines 28—28 of Fig. 23.

At the point in the side rail where the front hangers of the rear spring are to be secured, channel-shaped inner reinforcements 106 are fastened inside of the box section side rails so as to rigidify the structure at this point and provide for the attachment of the hangers. In this modification, the hanger is in the form of a stamping which is substantially hollow or box-shaped with a pair of depending apertured side walls 107 terminating at their upper edges in offset portions 108 adapted to snugly embrace opposite sides of the side rail 80. The bridging portion 109 between these two arms is provided with a horizontal shelf portion 110 adapted to engage the underside of the tubular rail to be welded or otherwise suitably secured thereto. The opposite end of the bracket is formed with a pair of inwardly extending wings 111 having their upper edges supporting and welded to the bottom of the side rail.

It will be understood that various changes in the size, shape and arrangement of parts may be resorted to without departing from the spirit of the invention or scope of the appended claims.

I claim:

1. An automobile frame comprising a pair of side rails each composed of a channel section having lateral flanges extending outwardly thereof and a plate secured to said flanges for closing in the channel to form the rail into box section throughout its entire length, cross members connecting the rails in spaced relationship, and one of the parallel walls of the channel section being offset in the direction of the flanges and into a plane normal to a plane passing through the edges of said flanges to enlarge the box section of the rail and to dispose the offset in a plane normal to the edge of one flange.

2. An automobile frame comprising a pair of side rails each composed of a light gauge channel section having lateral flanges extending outwardly thereof and a heavier gauge plate secured to said flanges for closing in the channel to form the rail into box section throughout its entire length, one of the parallel walls of the channel section being offset into a plane normal to a plane passing through the edges of said flanges, a heavier gauge member inside of the box section secured to said heavier gauge plate and bearing against said offset wall, and a frame adjunct secured to said wall and said member and to said heavier gauge closing plate.

3. An automobile frame comprising a pair of side rails, each composed of a light gauge channel section having lateral flanges extending outwardly thereof and a heavier gauge plate secured to said flanges for closing in the channel to form the rail into box section throughout its entire length, one of the parallel walls of the channel section being offset into a plane normal to a plane passing through the edge of the adjacent flange, a heavier gauge member secured inside of the box section to said heavier gauge plate and against which said offset wall bears, and cross members having their ends extended through said heavier gauge plate and member and secured thereto for connecting the rails in spaced relationship.

4. An automobile frame comprising a pair of side rails each composed of a box section throughout its entire length, pressed steel bumper horns having sides closely engaging the ends of said box section rails to form opposed walls of the rails into double thickness, and a cross member having its ends extending through said rails and horns and secured thereto where the double thickness walls are formed thereby.

5. An automobile frame side rail composed of a light gauge channel shaped side rail having a horizontal flange terminating in a vertical margin, a portion of said horizontal flange being perforated and offset to dispose it in the horizontal plane of the free edge of said vertical margin for supporting a body, and a clinch nut aligned with said perforation and secured to the inner surface of the offset portion to receive a fastener for securing an adjunct to said offset portion.

6. An automobile frame side rail composed of a light gauge channel shaped section having a horizontal flange terminating in a vertical flange, and a portion of said horizontal flange being perforated and offset to dispose part of it in the horizontal plane of the free edge of said vertical flange and another part of it in the vertical plane of the web of the channel section for supporting a body.

7. An automobile frame comprising a pair of side rails each composed of a light gauge channel section having lateral flanges extending outwardly thereof and a heavier gauge plate secured to said flanges for closing in the channel to form the rail into box section throughout its entire length, one of the parallel walls of the channel section being offset into a plane normal to a plane passing through the edges of said flanges, a heavier gauge member inside of the box section secured to said heavy gauge plate and bearing against said offset wall, and a spring hanger secured to said offset wall and said member and to said heavier gauge closing plate.

8. An automobile frame member comprising a light gauge channel section having lateral flanges extending outwardly thereof, and a heavier gauge plate having a portion offset co-extensive with the width of the channel to provide a pair of shoulders which are moved into the open channel to abut the bends formed between the side walls of the channel section and the lateral flanges, and the margins of said heavier gauge plate being secured to said lateral flanges with the offset portion arranged wholly within the channel to support the flanges of the channel section.

9. An automobile frame comprising a pair of side rails each composed of a light gauge channel section member, a heavy gauge member closing said channel, a heavy gauge L-shaped member located within said hollow section with one arm connected to the channel closing member, and a heavier gauge member fastened to said channel closing member and to one arm of said L-shaped member with fastening means common to all three heavy gauge members.

10. An automobile frame comprising a pair of side rails of hollow section connected in spaced relation and each having aligned holes, a reinforcing insert of sheet metal disposed in each hollow section rail with its opposite edges in engagement at opposite walls of said section, and said insert comprising a single strip of metal bent with a sleeve portion formed at each end for alignment with said holes in its respective rail, and having an integral tab formed on an edge of the strip for attachment to the rail.

11. An automobile frame comprising a pair of side rails of hollow section connected in spaced relation and having aligned holes, a reinforcing insert of sheet metal disposed in each hollow section with its opposite edges in engagement with opposite walls of said section, and said insert comprising a single strip of metal bent to V-shape with a sleeve portion formed at each end and at the V bend for alignment with said holes in its respective rail, and the arms of the V-shaped insert having angular integral tabs for attachment to opposite walls of its respective rail.

12. In an automobile frame comprising a pair of side rails each composed of a laterally facing channel section, a heavier vertical plate closing said channel, a spring hanger of U-form secured to the rail with the portion connecting its two arms spaced below the rail and one arm of the U secured to said heavier vertical plate and the other arm secured to the underside of the rail.

13. An automobile frame comprising a pair of side rails each composed of an inverted U-shaped section with vertical flanges terminating in horizontal flanges, a cross member having its ends spanning the channels of the U-shaped section, and channel-shaped brackets receiving the ends of the cross member and having their channels opening toward the channels of the rails with their vertical sides terminating in horizontal flanges secured transversely to those of the side rails, and said brackets being fastened to the flanges of the side rails.

14. In an automobile frame comprising a pair of side rails each composed of an inverted U-shaped section with vertical flanges terminating in horizontal flanges, a plate secured to said flanges to form it into hollow section and having the part which bridges the channel of said section offset into the same beyond the plane of said flanges, and a second member secured to the edges of said plate and bridging the offset portion to form a third hollow section therewith.

15. An automobile frame side rail composed of a light gauge channel-shaped side rail having a horizontal flange terminating in a vertical margin, a portion of said horizontal flange being perforated and offset to dispose it in the horizontal plane of the free edge of said vertical margin for supporting a body, and a heavier gauge member secured within the channel with a portion abutting and backing up said offset portion.

IVAR G. EKLUND.